US009578050B1

(12) United States Patent
Barabash et al.

(10) Patent No.: US 9,578,050 B1
(45) Date of Patent: Feb. 21, 2017

(54) SERVICE DELIVERY CONTROLLER FOR LEARNING NETWORK SECURITY SERVICES

(71) Applicant: International Business Machines Corporation, Armonk, NY (US)

(72) Inventors: Katherine Barabash, Haifa (IL); Yaniv Ben-Itzhak, Kiryat-Yam (IL); Hani T. Jamjoom, Cos Cob, CT (US); Anna Levin, Haifa (IL); Eran Raichstein, Yokneam Ilit (IL); Shriram Rajagopalan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/010,637

(22) Filed: Jan. 29, 2016

(51) Int. Cl.
*H04L 29/06* (2006.01)
(52) U.S. Cl.
CPC ...... *H04L 63/1425* (2013.01); *H04L 63/0236* (2013.01); *H04L 63/1416* (2013.01); *H04L 63/20* (2013.01)
(58) Field of Classification Search
CPC ......... G06F 21/00; H04L 12/26; H04L 67/20; H04L 63/0272; H04L 63/0263; H04L 63/1458; H04L 43/12; H04L 45/02; H04L 47/11; H04L 43/08; H04L 47/10; H04L 41/5067; H04L 41/5019; H04L 43/0817; H04L 63/1408; H04L 63/141; G01R 31/08
USPC ............................... 726/22–25; 709/222–225
See application file for complete search history.

(56) References Cited

U.S. PATENT DOCUMENTS

| 6,351,775 | B1 | 2/2002 | Yu | |
| 8,274,895 | B2* | 9/2012 | Rahman | H04L 47/10 370/235 |
| 8,875,133 | B2 | 10/2014 | Hayward et al. | |
| 9,210,181 | B1* | 12/2015 | Nandy | H04L 63/1408 |
| 9,270,765 | B2* | 2/2016 | Narayanaswamy | H04L 67/20 |
| 2008/0256533 | A1 | 10/2008 | Ben-Yehuda et al. | |
| 2010/0071024 | A1* | 3/2010 | Eyada | H04L 63/0263 726/1 |

(Continued)

OTHER PUBLICATIONS

Katz, et al. "A scalable http server: The ncsa prototype," Computer Networks and ISDN systems, vol. 27, No. 2, pp. 155-164, 1994.

(Continued)

*Primary Examiner* — Thanhnga B Truong
(74) *Attorney, Agent, or Firm* — Scully, Scott, Murphy & Presser, P.C.; Louis J. Percello, Esq.

(57) ABSTRACT

A learning-based computer network security system may include a service delivery controller executing on one or more of hardware processors that receives requests for transmitting network flows to one or more destination machines via a communication network. The service delivery controller may group the network flows into one or more similarity groups, and direct the network flows in a particular similarity group to a learning-based security appliance instance designated for the particular similarity group. Based on receiving feedback from the security appliance instance, the service delivery controller may regroup the similarity groups, and/or redirect the network flows, and/or redistribute the training results between the appliances, and/or modify assignment of appliances to similarity groups.

20 Claims, 7 Drawing Sheets

(56) References Cited

U.S. PATENT DOCUMENTS

| | | |
|---|---|---|
| 2014/0101306 A1 | 4/2014 | Murgia |
| 2015/0135317 A1 | 5/2015 | Tock et al. |
| 2015/0215183 A1* | 7/2015 | Bucci .................... H04L 43/12 370/252 |

OTHER PUBLICATIONS

Mogul, J.C., "Network behavior of a busy web server and its clients," WRL Research Report 95/5, Oct. 1995, 58 pages, Palo Alto, CA.

Bestavros, et al. "Distributed packet rewriting and its application to scalable server architectures," Proceedings of the 1998 International Conference on Network Protocols (INCP '98), Oct. 1998, pp. 290-297.

Aversa, et al., "Load balancing a cluster of web servers: using distributed packet rewriting," Conference Proceeding of the IEEE International Performance, Computing, and Communications Conference, Feb. 20-22, 2000, pp. 24-29, Phoenix, AZ.

Androulidakis, et al., "Improving network anomaly detection via selective flow-based sampling," Communications, IET, vol. 2, No. 3, Mar. 2008, pp. 399-409.

Anonymous, "Content-addressable memory," https://en.wikipedia.org/wiki/Content-addressable_memory#Ternary_CAMs, Last modified Jan. 4, 2016, 5 pages.

Cisco "Enabling Service Chaining on Cisco Nexus 1000V Series," pp. 1-25, 2013.

Tail-F Systems, "Tail-f NCS Dynamic Service Chaining Service Chaining : Service Chaining What and why?", Sep. 2013, 8 pages.

Huawei, "Enabling Agile Service Chaining with Service Based Routing" 12 pages, 2013.

Claise, B., "Cisco systems netflow services export version 9," Oct. 2004, pp. 1-33.

IBM, "IBM Security QRadar QFlow Collector" http://www-03.ibm.com/software/products/en/qradar-qflow-collector, Printed on Jan. 28, 2016, 2 pages.

IBM, "IBM Security QRadar VFlow Collector" http://www-03.ibm.com/software/products/en/qradar-Vflow-collector, Printed on Jan. 28, 2016, 2 pages.

Cisco Systems, "Data Center : Load Balancing Data Center Services SRND", Solutions Nework Design, Cisco Systems, Inc., Mar. 2004, 94 pages, San Jose, CA.

Halpern, et al., "Service Function Chaining (SFC) Architecture" Internet Engineering Task Force (IETF), Oct. 2015, 32 pages.

* cited by examiner

SERVICE DELIVERY CONTROLLER FOR LEARNING NETWORK SECURITY SERVICES

FIELD

The present application relates generally to computers and computer applications, and more particularly to computer network security.

BACKGROUND

Distribution of traffic flows between multiple redundant servers is also known as load-balancing. In web services, load-balancing includes distributing and assigning incoming client connections across a cluster of web servers. There are known works that rely on Round-Robin Domain Name System (DNS) (RR-DNS) to distribute incoming client connections across a cluster of servers. Traditional load balancing can be employed on Internet Protocol (IP) level, which performs load-balancing based on flow tuple or according to the relative load on the different servers in the cluster. There are also load-balancers which are employed on Layer 4 and Layer 5 of the Open System Interconnection model (OSI model). For instance, a module provides a modular solution for scaling Layer 4 and Layer 5 data center server farm services, for example, by determining the type of request by inspecting the Uniform Resource Locator (URL) and then forwarding the request to the appropriate server. Other load-balancers exist for network proxy servers; they are based on the proxy-server's cache-content and their goal is to increase the cache hit ratio rather than get equal server loads. Advanced modern load balancers are usually application aware and are called application delivery controllers.

Security appliances traditionally were offered as monolithic physical devices. In modern scale out environments these appliances are often distributed to cope with scale and dynamicity of the traffic and thus require load balancing to spread the load between the different instances of the appliance. However, traditional load balancing solutions used for web and proxy servers are not well suited to learning security appliances. For example, network security appliances are inherently different from traditional web and proxy servers. The main goal of cache proxy servers' is to cache data, while providing high cache-hit rate. On the other hand, network security appliances generate statistics, maintain different phases (transition between learning phase about network traffic and non-learning phases), and generate different decisions based on their collected statistics and the current phase. The operation of anomaly detection based network security appliances generally may include two separate steps: the first step is called training phase wherein a normal traffic profile is generated; the second phase is called anomaly detection, wherein the learned profile is applied to the current traffic to look for any deviations.

For better load balancing, traditional load-balancers are provided with specific feedback from the servers behind the load balancer. For example, to ensure equal load distribution, servers provide load feedback to the load-balancer. Another example is increasing the cache hit-ratio of proxy-based load-balancers, wherein the cache hit-ratio of individual proxy servers is fed back to the load-balancer. The feedback information in these cases pertains to a single dimension/metric.

BRIEF SUMMARY

A learning-based computer network security system and method may be provided. The system in one aspect may include a network security service delivery controller executing on one or more hardware processors. The network security service delivery controller may be operable to receive network flow attributes associated with the network flow, the network flow to be sent to one or more destination machines via a communication network. The network security service delivery controller may be further operable to group the network flow into a similarity group at least based on the network flow attributes associated with the network flow, wherein the network security service delivery controller groups a plurality of network flows into a plurality of similarity groups. The network security service delivery controller may be further operable to designate one or more network security appliance instances from a plurality of network security appliance instances for a particular similarity group, wherein the network security service delivery controller designates each of the plurality of similarity groups respectively to one or more network security appliance instances in the plurality of network security appliance instances. The network security service delivery controller may be further operable to direct transmission of the network flow to the one or more network security appliances designated for the similarity group associated with the network flow. The plurality of network security appliance instances may comprise hardware processors running network security appliance functionality. Each of the plurality of network security appliance instances may learn to detect anomaly in the network flows associated with the respective similarity group at least based on the network flows it receives.

A computer-implemented method of providing learning-based computer network security, in one aspect, may include receiving by a network security service delivery controller executing on one or more hardware processors, network flow attributes associated with a network flow, the network flow to be sent to one or more destination machines via a communication network. The method may also include grouping by the network security service delivery controller the network flow into a similarity group at least based on the network flow attributes associated with the network flow, wherein the network security service delivery controller groups a plurality of network flows into a plurality of similarity groups. The method may also include determining by the network security service delivery controller one or more network security appliance instances from a plurality of network security appliance instances for a particular similarity group, wherein the network security service delivery controller designates each of the plurality of similarity groups respectively to one or more network security appliance instances in the plurality of network security appliance instances. The method may also include directing transmission of the network flow to the one or more network security appliances designated for the similarity group associated with the network flow. The plurality of network security appliance instances may comprise hardware processors running network security appliance functionality. Each of the plurality of network security appliance instances may learn to detect anomaly in the network flows associated with the respective similarity group based on the network flows it receives.

A computer readable storage device or medium storing a program of instructions executable by a machine to perform one or more methods described herein also may be provided.

Further features as well as the structure and operation of various embodiments are described in detail below with

DETAILED DESCRIPTION

Figure 1:
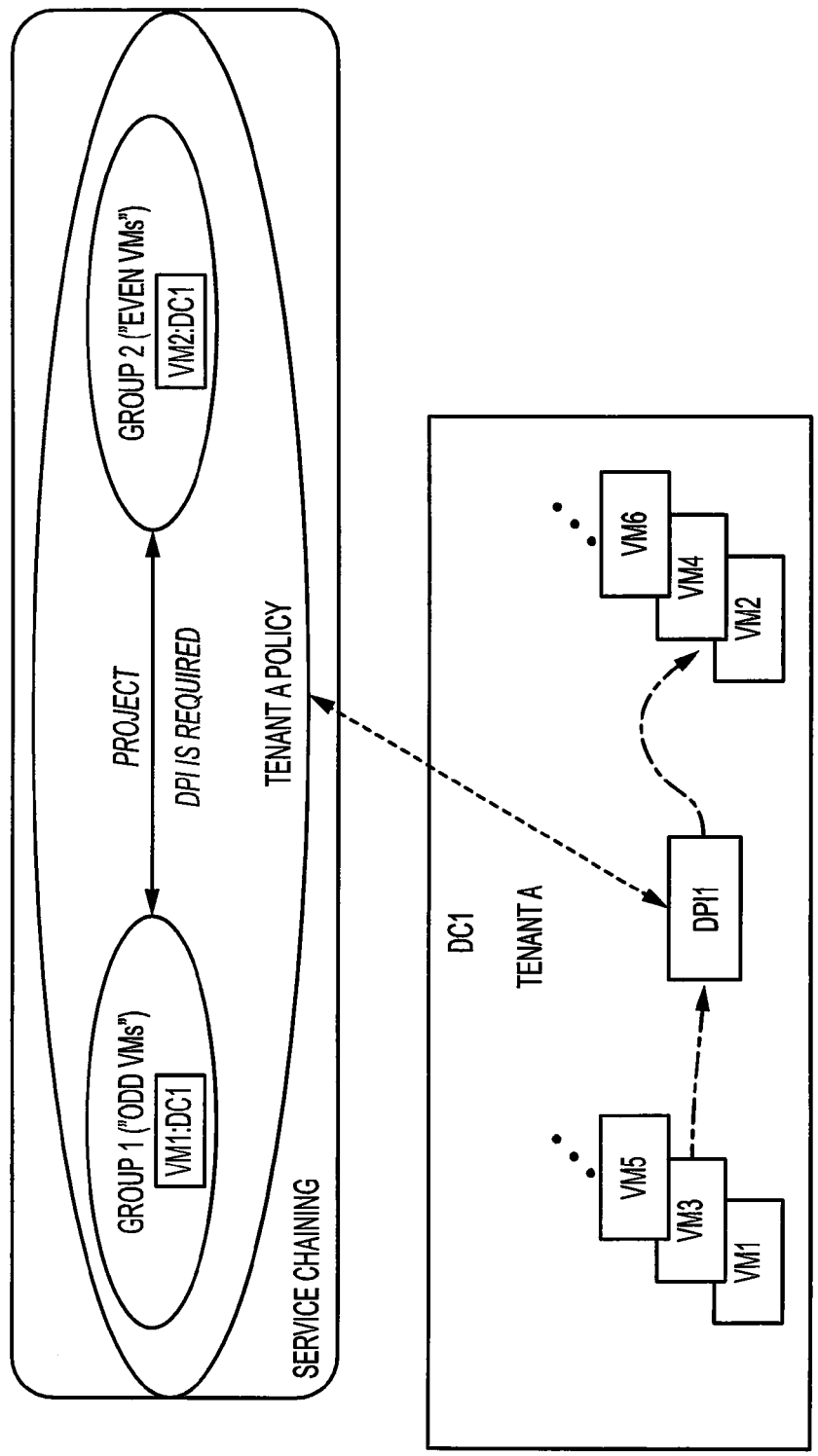
FIG. 1 illustrates an example use scenario in one embodiment of the present disclosure.

A system, method and/or techniques for efficient delivery of learning-based network security services may be provided. A network flow refers to the traffic between two endpoints such as computers or processors in the network of computers. There may exist hundreds of thousands of network flows in data center network. Briefly, network security appliances refer to hardware and/or software devices or modules that provide a range of security features in a computer network, for example, firewall, gateway antivirus, intrusion detection system (IDS) or intrusion prevention capabilities, and other security capabilities. The present disclosure recognizes that the performance and the accuracy of anomaly detection based security appliances may highly depend on the similarity across different network flows in the traffic assigned to each instance of the appliance. Thus, in one aspect, optimizing the security performance of such security appliances may involve a new approach of load-balancing the network traffic between the security appliance instances across the network.

In one embodiment, the system and method of the present disclosure leverages a multi-instance network security appliance that includes multiple instances (referred to as network security appliance instances or security appliance instances). A network security appliance is also referred to as a security appliance. Each of the multiple instances of a network security appliance (also referred to as a security appliance) may include one or more hardware processors, or may be deployed and run on one or more hardware processors. A network connectivity controller manages the network switches and may receive network traffic forwarding requests from the switches, which may require a network decision. The traffic may be forwarded to a network security service delivery controller (also referred to as a service delivery controller or security service delivery controller). The network security service delivery controller manages the network security appliance instances, receives information about the network flow each of the network security appliance instances processes and may also receive network traffic and associated information from the network connectivity controller.

Unlike in the traditional load-balancing, optimizing the performance of network security appliances may involve multi-dimensional feedback information; such as, the current phase (e.g., training, detection, enforcement), the amount of similarity among processed network flows, current security rule content in their ternary content-addressable memory (TCAM).

Recognizing that there exists a known trade-off between the volume of processed traffic at a given security appliance and its anomaly detection accuracy, the system, method and/or techniques of the present disclosure in one embodiment may distribute groups of similar network flows across training-based security appliance instances (with the same basic functionally) in order to achieve better security performance.

The system, method and/or techniques of the present disclosure in one embodiment may maximize the security appliance performance by assigning groups of similar flows to the same security instance. Similarity in this context implies the relationship between flows in a group, such as all network flows belonging to a particular customer's servers in the data center. This approach optimizes the training phase period of the security appliance, improves the overall coverage achieved by security rules across all security instances, and reduces the performance degradation penalty incurred during update of security rules between the security instances.

In the present disclosure in one embodiment, a network service delivery controller is provided that introduces network security functionality, which for example, may optimize the network security service performance. In one embodiment, efficient delivery of training-based security service may be provided in large scale networked environments where multiple instances of a network security appliance that provides a network security service are deployed, for example, in order to cope with the amount of network traffic or due to geographic dispersed locations. The network security service delivery controller, in one embodiment of the present disclosure, assigns network flows to network security appliance instances according to multiple domain-specific criteria beyond those considered by existing load balancing solutions, with a goal of improving the quality of the security service in the system, for example, even if sacrificing the network performance (e.g., by inducing longer network paths).

The network security service delivery controller in one embodiment may be a computer-implemented component, for example, a software functionality executing on a computer processor, which provides a delivery service. In one embodiment, the functionality of the service delivery controller may be implemented into an existing security appliance with modifications. In another embodiment, the functionality of the service delivery controller may be designed and implemented as a new security appliance. The network security service delivery controller in one embodiment employs a network entity to capture flows, for instance near (or by) the network gateway, or on any other place in the network. After detecting similarity groups, the network security service controller in one embodiment assigns flows to network security appliance instances by the help of external or internal load-balancer, through the gateway or another network entity. In another embodiment, the network security service delivery controller may obtain flow samples of a network switch via a network connectivity controller. After detecting similarity groups, the network security service controller in this embodiment assigns flows to the network security appliance instances by using the network connectivity controller which in turn configures the switches in the network so that they enforce the assignment.

The criteria considered by the service delivery controller of the present disclosure in one embodiment relate to the security appliance instances' states (e.g., training phase, enforcement phase, detection phase) and their memory (e.g., TCAM) content, for example, to ensure each flow is assigned to the network security appliance instance trained on flows with highest level of similarity to the flow at hand. The network security service delivery controller of the present disclosure in one embodiment may also enable improved and uniform security rules coverage among the appliances in the pool, avoiding state-duplication whenever possible.

Each of the network security appliance instances trains itself automatically, by machine learning based on the network flow it receives, to recognize network flow or traffic that has an anomaly or is malignant. During a rule-training phase of a security appliance instance, a certain minimum number of packets of the same similarity group are required to be transmitted through the security appliance instance until normal traffic profile is generated in order to detect anomalies in the network traffic. Transmitting more packets through the network security appliance instance improves its anomaly detection accuracy. Hence, by assigning similar flows to the same instance of the network security appliance, the training phase period can be reduced and a faster/better anomaly detection accuracy can be achieved. In one embodiment of the present disclosure, once a security rule is generated, the security rule may be stored in TCAM (e.g., for performance reasons). By sending flows through the same network security appliance instance, one can exploit the TCAM content, avoid security rules update cost over other network security appliance instances, and gain higher total security rules coverage over the network security appliance instance's TCAMs. In one embodiment, this kind of security appliance load-balancing can be also employed as part of service chaining.

The training can be done also by several instances. Each instance may see a partial picture of the total assigned network flows, and their obtained information can be shared via the network.

In one embodiment, a method and system of the present disclosure may identify similarity flow group as a sequence of packets with one or more common properties. For example, flow records include details such as IP addresses, packet and byte counts, timestamps, Type of Service (ToS), application ports, input and output interfaces, other TCP flags, closeness in time, and other properties. For instance, tools or methodology for performing flow analysis service, flow correlation, and identifying application-layer visibility into virtual network traffic may be utilized to discover common properties among the network traffic.

The methodologies of the present disclosure may be employed in the following general cases: Service delivery over a single network; and Service delivery over multiple networks spread across a wide geographical area, co-operating with one another.

In the single network case, the method and/or system of the present disclosure in one embodiment may divide the network flows into similarity groups, and assign each flow group to the same training-based network security appliance instance, or small set of instances, to reduce the sync overhead, and have higher number of flows per each instance, for example, a Deep-Packet-Inspection (DPI) appliance. Briefly, DPI looks at the payload of a packet and may examine the data part or content of the packet to determine whether to allow the packet through a network, e.g., for security reasons.

In one embodiment, such similarity flow group decisions can be improved by feedback regarding the quality of similarity flow groups, from the network security appliance instances themselves to the network security service delivery controller of the present disclosure. For instance, a network security appliance instance can: 1) Identify that a specific similarity flow group can be divided into much smaller groups, which might modify the network service delivery controller's decisions; 2) Identify that two different flow groups should be unified; 3) Request more flows of the similar flow group in order to improve its statistics.

Such feedback may improve the security appliance instance placement decision of the network service delivery controller in one embodiment. Based on the improved similarity flow groups derived by the training instance, the network service delivery controller of the present disclosure in one embodiment may better decide where to place other instances of the network security appliance instance and which similarity flow group to assign for each one of them. Hence, in one embodiment, a placement decision of the instances in the network may also be provided, for software-based appliances which can be employed over commodity servers. This feedback may also improve the future similarity group decision of the service delivery controller in one embodiment.

In the multiple networks case, the service delivery controller in one embodiment of the present disclosure may use a fixed single security instance for each similarity flow group, thereby reducing state migration (or duplication) and updates between security instances, and achieving better knowledge-base over each security instance, which results in shorter training-phase period, lower false-positive alarms, and therefore higher security performance. Assigning a similarity flow group to the same security appliance instance may cause route detour for one or more packets in the network, which might increase their network latency. In one embodiment, the service delivery controller may sacrifice network performance in order to gain higher accuracy in detecting security issues.

By avoiding situations in which several security appliance instances process the same similarity flow group unnecessarily, state-updates between these security appliance instances are avoided. Moreover, such state-updates increase the latency till network anomaly is detected or a security rule is generated. Therefore, by avoiding such state-updates, the method and/or system of the present disclosure in one embodiment may achieve faster network anomaly detection and faster security rules generation.

Responsive to the establishment of a similarity flow group, the service delivery controller of the present disclosure in one embodiment assigns a specific security appliance instance, which can be selected according to network criteria. The selected security appliance instance then receives all the traffic of this flow group, and therefore is able to gain most of available statistics (as soon as possible) in order to define the proper security rules.

In one embodiment, the service delivery controller decisions may also depend on the current appliance's state. During the training-phase, the service delivery controller may transmit a large number of similar flows (called a flow group), in order to help the network security appliance instance to collect statistics. After calculating the security rules for the flow group, the network security appliance instance can transition to the next new phase namely rule-enforcement. At the same time, these flows can be transmitted to other security network appliance instances, after updating them with the corresponding security rules. In one embodiment, the security rules may be transferred directly from the learning instance (network security appliance instance) to the other network security appliance instance(s). In another embodiment, the security rules may be transferred from the learning instance to the controller and then to the other network security appliance instance(s). In one embodiment, the network flows can be re-distributed over the new group of network security appliance instances through a dedicated network entity (gateway, or other), through which all flows are first transmitted. In another embodiment, the network connectivity controller may configure the switches to redistribute the network flows over the new group of network security appliance instances. The service delivery controller in one embodiment may divide similarity group flows among the security appliance instances, and also consider the security appliance instance phases and synchronize security rules for a flow group across other security appliance instances before rerouting flows from one security appliance instance to another.

Knowledge regarding the security appliance state (e.g., training-phase, rule generation) can be obtained by making the network security appliance instance send updates to the network security service controller (e.g., after generating security rule(s) for a specific similarity flow group). In another embodiment, the network service controller may poll the security appliance instances for the information. In cases where a new uncorrelated traffic (i.e., not belonging to any known similarity flow group) is transmitted through a network security appliance instance (for instance, due to default routing/gateway), the network security appliance instance can update the service delivery controller, and request to 'take charge' of the new similarity flow group (if any). The network security service delivery controller (e.g., a load-balancer associated with the controller) decides or determines which security instance to assign, according to network criteria, and according to the security appliance instances' requests, current states, and current security rules content.

In one embodiment of the present disclosure, possible degradation of network performance during the training phase may be addressed by assigning each similarity flow group to a different training instance and using the feedback between the training instance and the service delivery controller to refine the similarity flow group, such that the service delivery controller can assign smaller similarity flow group to each training instance. Such refinement may reduce the network overload over each training instance. During the training phase the service delivery controller may designate single or set of instances in order to perform global training, without being in the data-path and affecting the traffic. These instances receive a copy of the traffic (e.g., by mirroring), while the traffic continues to flow through its assigned security instance as usual. These network security appliance instances, designated to global learning, accumulate large amounts of quality learning information that is later used by the network security service delivery controller to inform other network security appliance instances.

In one embodiment, the service delivery controller for network security appliances targets training-based network security appliance instances. The service delivery controller's decisions may depend on different feedbacks from the network security appliance instances, and in particular on the appliance instance's current phase. The service delivery controller may synchronize security rules among different network security appliance instances. For example, the service delivery controller may direct the security rules be transferred directly between the network security appliance instances or from the network security appliance instance to the service delivery controller and forwarded to the other network security appliance instances.

In one aspect, the security-wise service delivery controller may take into account the trade-offs between: security rule update cost, network access cost, training phase period, and total number of security rules over all security appliances, etc. The methodologies of the present disclosure in one embodiment may be extended to any kind of temporal capability awareness of network appliance. For instance, the service delivery controller may favor network performance over security by assigning traffic to a near-by security appliance instance that stores in its memory smaller number of security rules and not to a security appliance instance that is farther from the source of the traffic, but stores in its memory a larger number of security rules.

FIG. 1 illustrates an example use scenario in one embodiment of the present disclosure. In the example shown, the method is implemented for multiple data-centers with training-based security appliances that perform Deep-Packet-Inspection (DPI) as an example. FIG. 1 presents a synthetic scenario in which a DPI is required between virtual machines (VMs), e.g., "odd VMs" and "even VMs" (e.g., VM1 communicates with VM2). For the sake of simplicity, assume that all VMs belong to the same tenant A. Therefore, the flow is transmitted through DPI1, which resides in the same data-center (DC1). DPI1 starts the training phase and gathers statistics.

Figure 2:
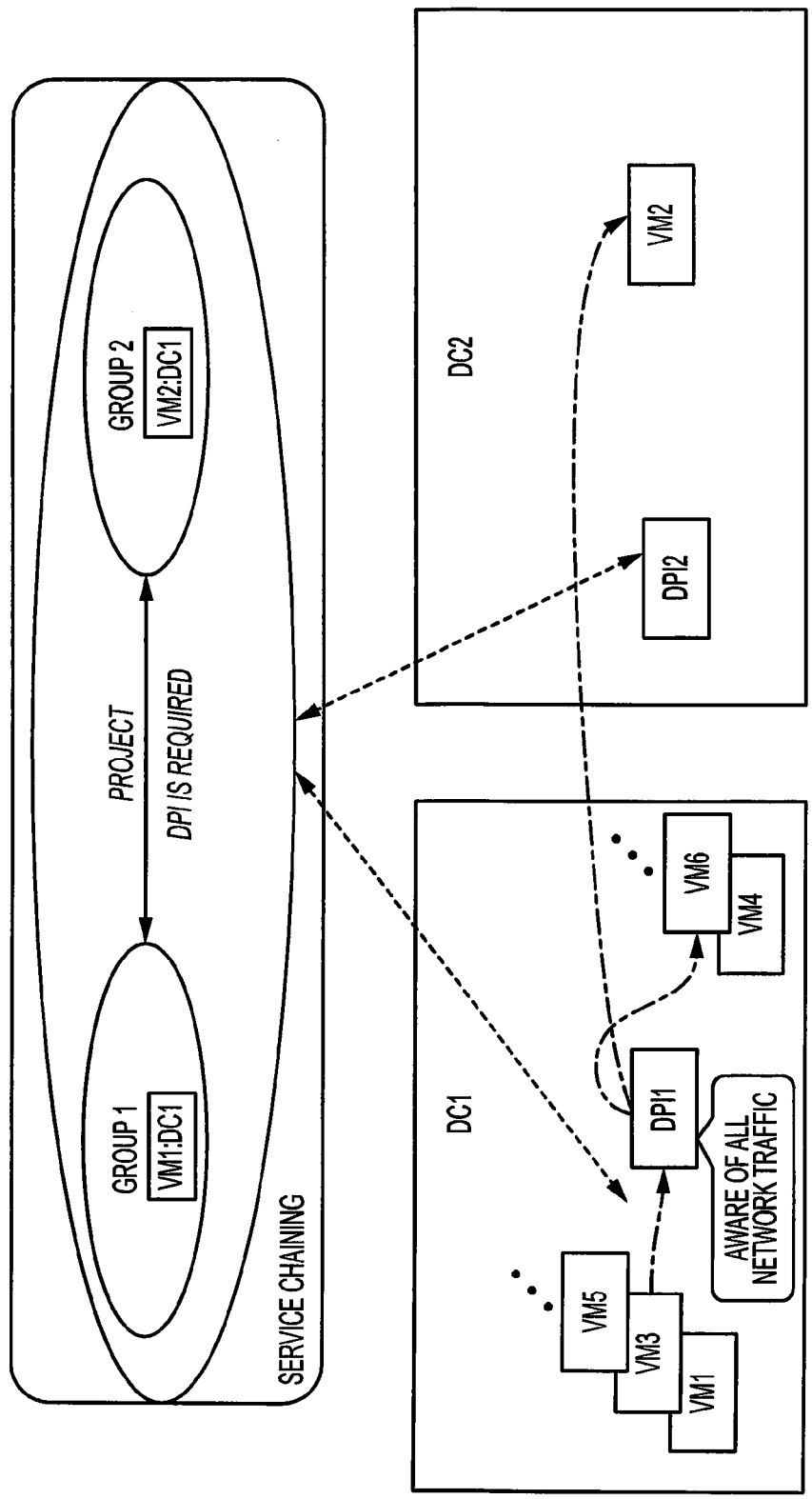
FIG. 2 shows an example scenario of FIG. 1 with a virtual machine that is migrated to another data center in one embodiment of the present disclosure.

FIG. 2 shows an example scenario of FIG. 1 with a virtual machine that is migrated to another data center in one embodiment of the present disclosure. Upon migration of VM2 to data-center DC2, the flow between VM1 and VM2 is still transmitted through the same DPI1, such that: If DPI1 is still in training phase, transmitting VM1→VM2 flows through it would reduce the time till a security rule is created; If DPI1 is in detection phase, transmitting VM1→VM2 flows through DPI1 would avoid the security rule update, as compared with transmitting VM1→VM2 flows through DPI2, which would be required to obtain the corresponding security rules from DPI1 or through the network security service delivery controller.

Figure 3:
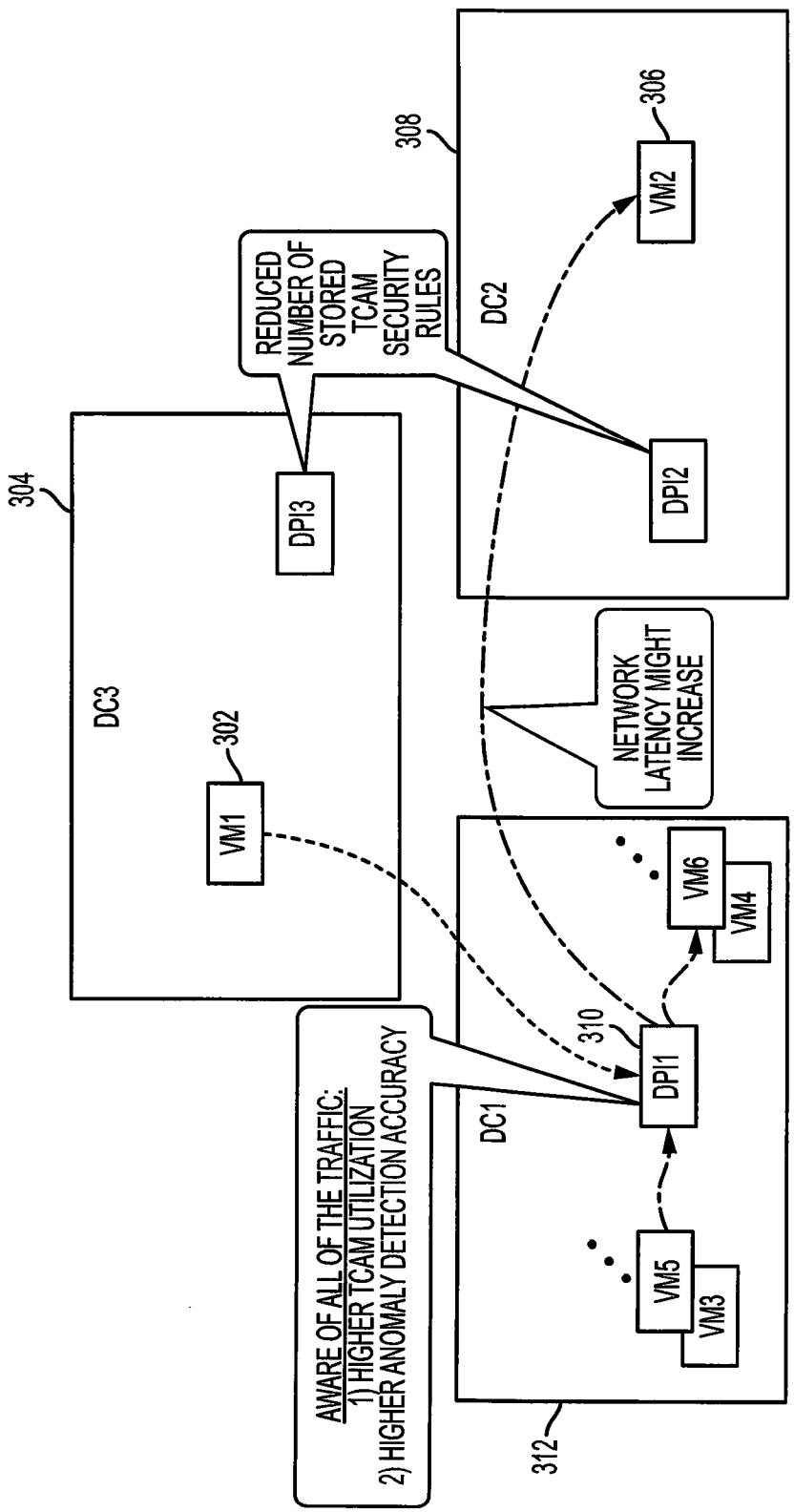
FIG. 3 shows another example scenario in which a virtual machine is migrated to another data center in one embodiment of the present disclosure.

FIG. 3 shows another example scenario in which a virtual machine is migrated to another data center in one embodiment of the present disclosure. In a case in which VM1 (302) is migrated to another data-center, e.g., DC3 (304), it may be beneficial to keep transmitting flows between VM1 (302) and VM2 (306) in data center DC2 (308) through DPI1 (310), for example, even if DPI1 (310) is running in data center DC1 (312). In such way, security rules update (duplicate) over DPI3 and/or DPI2 is avoided; therefore, reducing the number of stored security rules over their TCAM, which also reduces their evacuation and miss-rates. Hence, higher total number of security rules can be stored over all security appliances in their TCAM. Moreover, faster network anomaly detection and faster security rules generation can be achieved.

On the other hand, maintaining the flows through the same security appliance (e.g., DPI1) may create inefficiency in terms of network latency. In one embodiment of the present disclosure, therefore, the network security service delivery controller may decide to replace one DPI with another or duplicate the DPI state (to DPI2 and/or DPI3), for example, in cases where a threshold number of the network traffic is rerouted or a threshold inefficiency level is achieved.

In one embodiment, the method and/or system of the present disclosure may apply to service chaining, which selects specific network appliances and employs a set of pipelined services, through which the network flow is sent. In one aspect, as opposed to existing service-chaining solutions, the method and/or system of the present disclosure introduces a different criteria, which optimizes the security service performance, e.g., rather than optimizing network performance and network appliances' loads.

A computer system, for example, may include one or more computer networks such as virtual networks, cloud network, a network of virtual machines, and/or a network of physical machines. One or more computers, for example virtual machines may have one or more interfaces that receive and transmit data. For instance, network flows are communicated (received and transmitted) through one or more network routes, for example, through interfaces, ports, switches, and/or connections. During a training period, the network security service delivery controller operating on one or more of the computers may identify flows belonging to a target similarity group from a plurality of similarity groups and re-route these flows into a single network security appliance instance where a pattern analysis is performed to identify a target pattern for the target similarity group. After the end of the training period, the target pattern may be distributed to one or more of the other network security appliance instances on the network and the network flows may be reconnected to the original route/connections. The network security service delivery controller may increase (decrease) the flow through the network security appliance instance to create a more accurate target pattern. The network security service delivery controller may aggregate (decompose) two or more target similarity groups to create an aggregated (decomposed) target pattern. The target patterns may be used as a base line on one or more of the network security appliance instances to determine network anomalies. The target similarity groups may have similar high level characteristics.

Figure 4A:
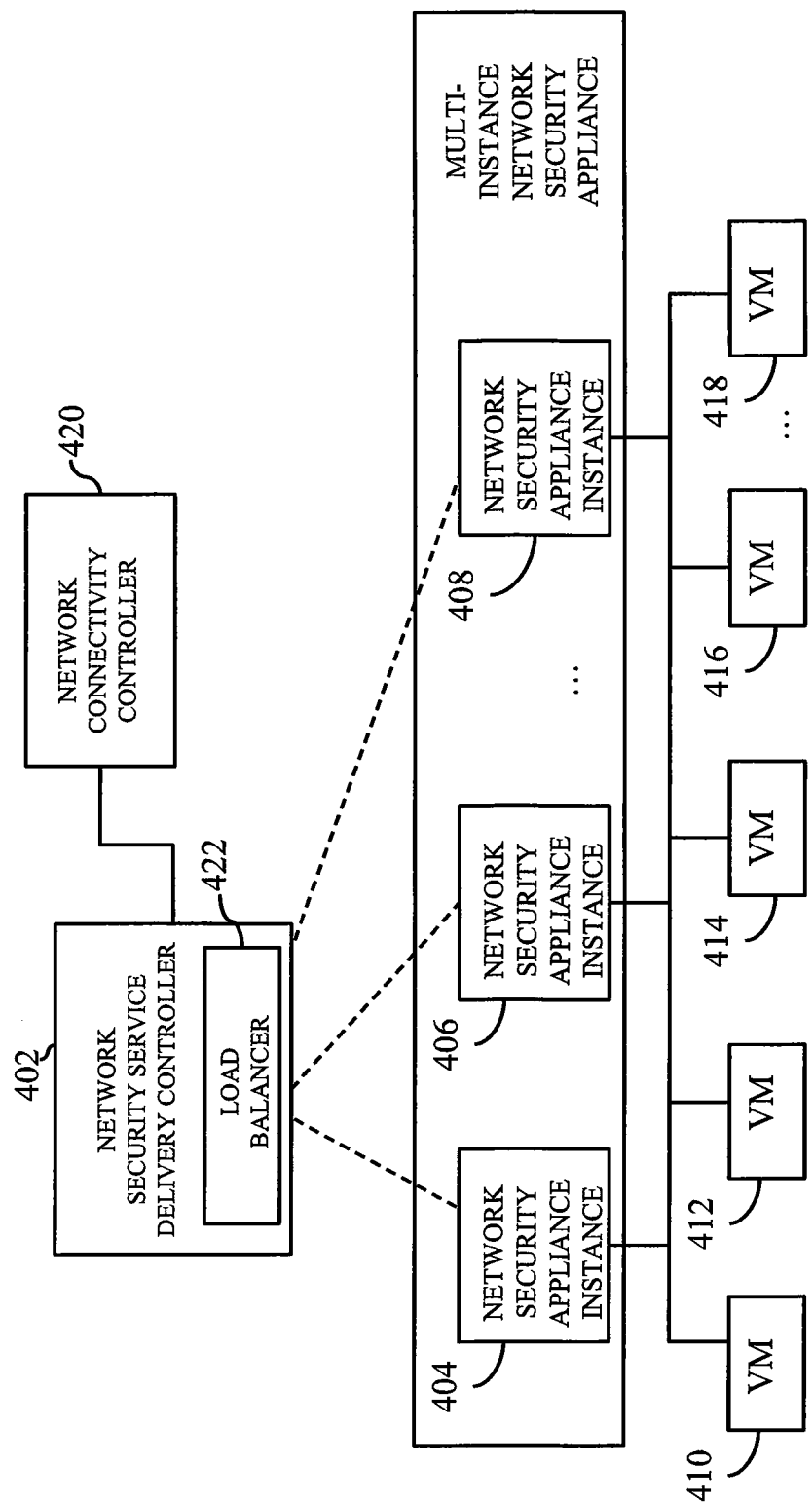
FIGS. 4A and 4B is a diagram showing components of a system in one embodiment of the present disclosure that provides learning-based network security service.
Figure 4B:
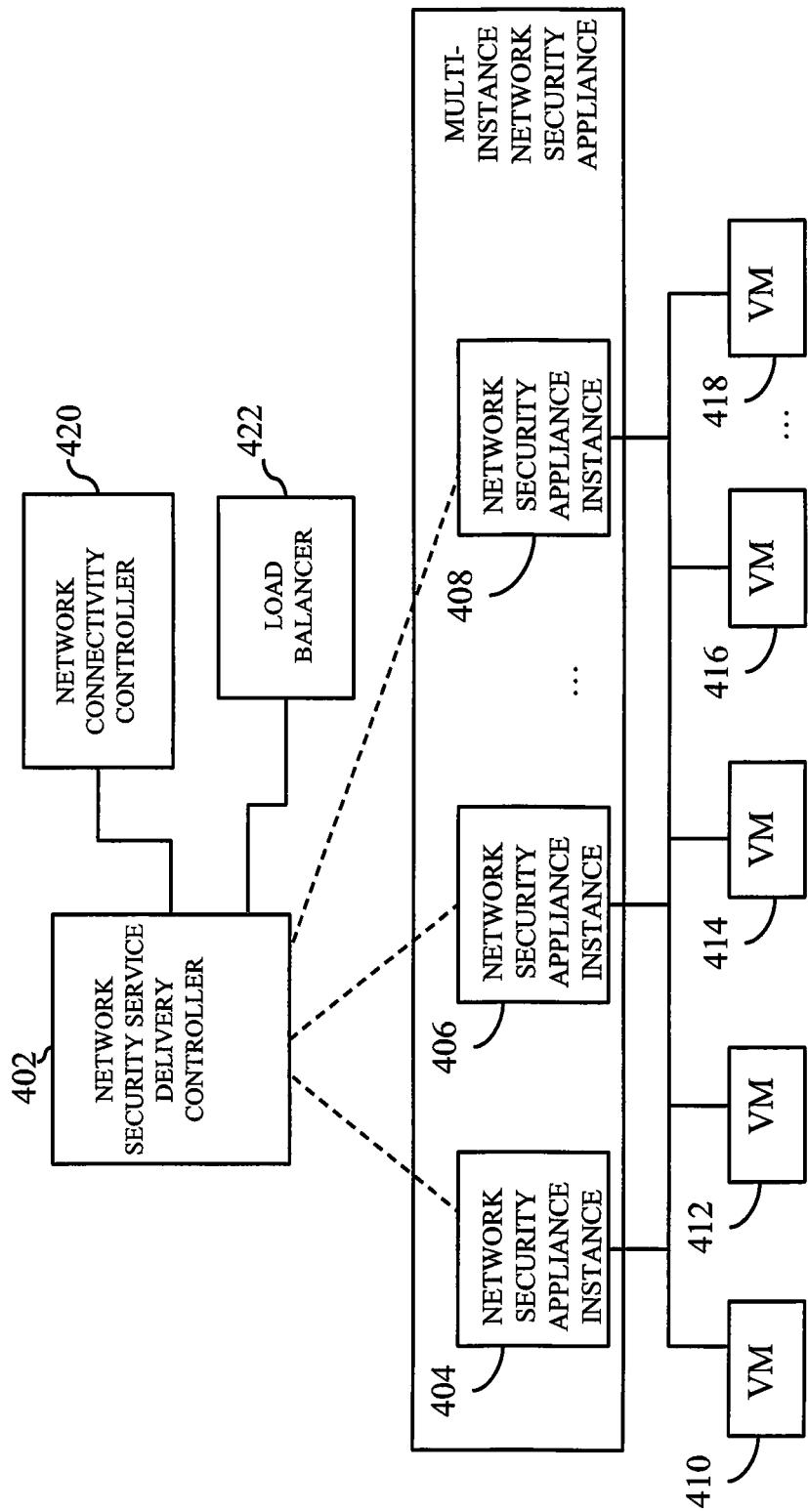

FIGS. 4A and 4B show components of a system in one embodiment of the present disclosure. A service delivery controller 402 (also referred to as a network security service delivery controller) executing on one or more hardware processors defines and manages flow similarity groups based on configuration it receives, based on traffic characteristics from the network connectivity controller 420 (or specific entity or gateway), and feedback received from service instances 404, 406, 408 (also referred to as network security appliance instances). For example, the service delivery controller 402 may receive information about a network flow (network flow attributes) and categorize the network flow into one of the similarity groups. A security appliance instance (e.g., 404, 406, . . . 408) may be designated for each of the similarity groups, e.g., by the network security service delivery controller 402. In one aspect, one network security appliance instance or set of instances may be designated to handle more than one similarity group.

A security network appliance comprises a plurality of security network appliance instances. The security network appliance, for example, defines the security functionality and the instances execute the security functionality. The network security appliance instances may include one or more hardware processor or component performing the functionality of the security network appliance, or are run on one or more hardware processors to perform the functionality of the security network appliance, and identify potential security problems with incoming traffic. The network security appliance instances are learning-based appliance instances that autonomously learn from the incoming traffic whether a network flow is anomalous. The network security appliance instances may also learn with the help of other instances. The network security appliance instances operate in training phase and resolving (testing) phase, and may utilize one or more machine learning algorithm to perform their learning.

All network flows belonging to a particular similarity group are transmitted to a respectively designated security appliance instance or a set of security appliance instances, e.g., 404. 406, . . . , 408. Once validated by the appropriate security appliance instance, a network flow may be transmitted to its target, or destination machine, that can be virtual machine, physical server or container (or any kind of network endpoints), e.g., one or more of 410, 412, 414, 416, 418. A virtual machine (e.g. 410, 412, 414, 416, 418) runs on one or more physical computers or computer processors. In FIGS. 4A and 4B, network flows are transmitted through the data-plane, e.g., hosts, switches and security instances, while the network security service delivery controller 402, load balancer 422, and network connectivity controller 420 in the control-plane manage the network entities. The network connectivity controller 420 manages switches, and the network security service delivery controller 402 manages the security appliance instances (404, 406, 408). The load balancer of the network security service delivery controller 402 may define or determine a particular security appliance instance's (404, 406, 408) similarity flow group. In one embodiment, the load balancer may be part of the network security service delivery controller 402 as shown in FIG. 4A. In another embodiment, the load balancer may be an external service which is controlled by the network security service delivery controller as shown in FIG. 4B, to define the instances' group for each flow similarity group.

In one embodiment, the service delivery controller 402 may cooperate with the network connectivity controller 420 (e.g., software-defined networking (SDN)) to cause the network flows to be diverted or mirrored to designated service instances, e.g., 404, 406, . . . 408. For example, the service delivery controller 402 manages switches to divert or mirror the network flows. In one embodiment, network flows may be redirected to a security appliance instance designated for a particular similarity group by the service deliver controller 402 cooperating with network connectivity controller 420. A network connectivity controller 420 may include hardware and software functionality that manages and handles network connectivity among devices, e.g., using a management API such as NetConf, OpenFlow, and/or others.

In one embodiment, the service delivery controller 402 may cooperate with (elastic) load balancer 422 governing the set of service appliance instances so the number of appliance instances assigned to handle specific similarity groups is modified dynamically according to the load. A load balancer 422 may include hardware and software functionalities that manages network flow load that is sent to the network security service appliance instances. The service delivery controller 402 may cooperate with an external load balancer via a management API.

In one embodiment, the service delivery controller 402 can be collocated with the network connectivity controller 420. In one embodiment, the service delivery controller 402 can be collocated with the (elastic) service load balancer 422.

In one embodiment, similarity flow group may include a group of flows which have the same attributes. The attributes can be in terms of: an application such as media application, social networking application, database application, and others; network attributes such as a protocol, same source IP address, same port, and others; and/or any other derived attributes of the network flows.

In one embodiment, the service delivery controller 402 may receive feedback information from one or more of the security network appliance instances 404, 406, . . . 408. For instance, a security network appliance instance may send as feedback its phase and flow properties to the service delivery controller 402. The feedback that a network appliance sends and the service delivery controller receives may include the following information for each similarity group: a) The instance phase, for example, whether in training phase or execution phase with established rules based on training; b) The training phase result; c) The quality of the similarity flow group; d) Identification or indication that a specific similarity flow group can be divided into smaller groups, which may modify the service delivery controller decisions, for example, even during training phase; e) Identification or indication that two different similarity flow groups should be unified; f) A request for more flows of the similar flow group in order to improve statistics. Other information may be transmitted and received as feedback. The service delivery controller 402 of the present disclosure in one embodiment may be considered as a phase-aware service delivery controller, for example, since the service delivery controller 402 is aware of the current phases or states of each of the network instances.

The service delivery controller 402 in one embodiment may also inform or send information regarding the similarity group to the appropriate network appliance instance. For example, the service delivery controller 402 may transmit to a network security appliance instance, information such as the percent of transmitted network flows out of the total network flows of specific similarity group. The service delivery controller 402 may determine the information, for example, from the traffic report of the switches through the network connectivity controller 420, the gateway, another network entity, and/or by the load-balancer decisions.

Responsive to identifying that a network security appliance instance (404, 406, 408) is in training phase, the service delivery controller 402 in one embodiment may transmit network flows that belong to the same similarity group to the same instance of the network security appliance, for example, in order to reduce the training phase duration. That is, for example, the security appliance's training phase duration may be based on the number of similar network flows it receives. Directing as many of the network flows in the same similarity group to one network appliance will shorten the training duration of that network appliance as it will have received the designated number of network flows for training.

By reducing training-phase duration, the network becomes less vulnerable, and has lower probability to profile malicious traffic as normal traffic. For example, the period of time that the network operates without security rules is decreased, decreasing the time period that the network may be subject to a network attack or an injection of malicious traffic, which may be considered as normal traffic during the training phase.

Responsive to identifying that a network security appliance instance is in resolution phase, the service delivery controller may update one or more other network instances of network security appliance with training phase result. Once the other network security appliance instances of network security appliance have updated training phase result, incoming or future network flows that belong to the similarity group may be transmitted or rerouted to those other network security appliance instances of network security appliance, for example, to load balance or off-load the amount of network flow that the network security appliance instance is receiving.

The service delivery controller 402 may perform optimization actions, for example, according to the feedback received from a network appliance. For instance, the service delivery controller 402 may: a) Make better similarity group decisions; b) Divide similarity group into sub-groups or finer groups of similarity; d) Unify two similarly groups; d) Transmit more flows towards an instance, in order to improve its statistics derivation during the training-phase; e) Allow for improved network security appliance instances placement during the resolution phase.

Based on the improved similarity flow groups derived by the training instance, the service delivery controller 402 may better decide where to place other instances of the network appliance and which similarity flow group (or sub group) to assign for each one of them. The service delivery controller 402 may use information about the similarity flow group network properties to determine the placement of the network security appliance instances. By knowing which similarity flows are assigned to a given network security appliance instance, the methodology of the present disclosure in one embodiment can optimize the placement of this instance in the network, in order to improve the network performance. e.g., by placing the instance along the similarity group flow's mutual route in the network, and/or by placing a network security appliance instance closer to the source of the flows. Network security appliances can be hardware or software-based. The deployment of the software-based network security network appliance can be managed by a controller, based on the knowledge of the similarity flows and feedback from the network security appliance instances. The physical placement of the network security appliance instances may involve cooperation with the deployment controller or manager of the network security appliance.

In one embodiment, a network security appliance instance (e.g., 404, 406, 408) of a network security appliance may be caused to perform optimization actions, e.g., according to the information from the service delivery controller 402. For instance, a network security appliance instance may perform tuning of the parameters of the training algorithm, according to the percentage of transmitted flows out of the total flows of the similarly group.

Because the service delivery controller 402 may direct all or substantially all network flows of same similarity group to a network security appliance instance of a network security appliance that is in training phase (for example, for more accurate training based on more data and for reducing the training phase duration), network traffic might not be balanced between several network security appliance instances of network appliance. Not balancing the traffic may result in network performance degradation. To address this degradation, the service delivery controller 402 in one embodiment may process the traffic by several instances of the network security appliance rather than by a single instance. The service delivery controller 402 may also direct mirroring the traffic to a single network appliance instance (or a set of instances) of a network security appliance that is in training phase. Such approach may avoid network performance degradation, while improving security performance.

Figure 5:
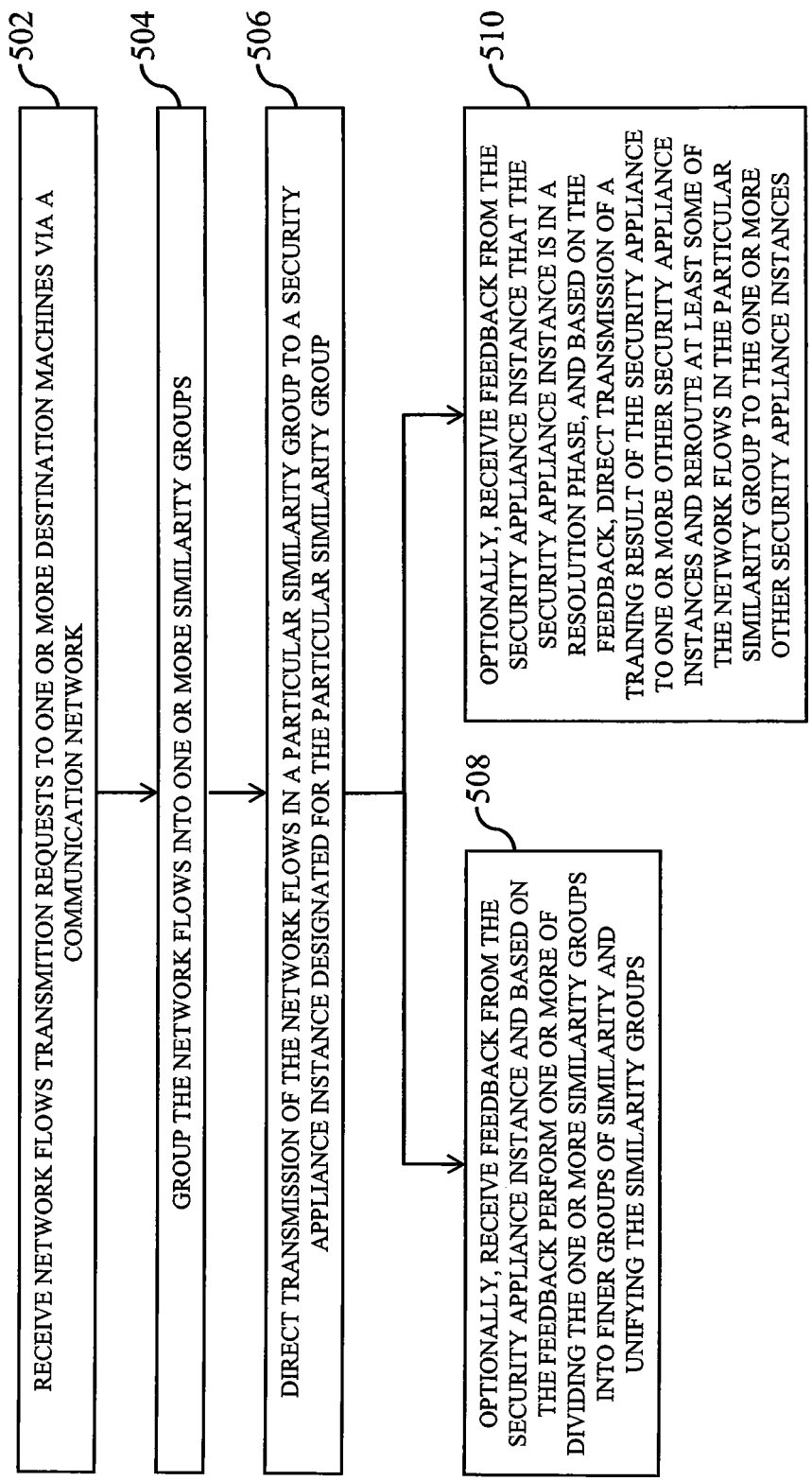
FIG. 5 is a flow diagram illustrating a method of learning-based network security service in one embodiment of the present disclosure.

FIG. 5 is a flow diagram illustrating a method of learning-based network security service in one embodiment of the present disclosure. At 502, a network security service delivery controller executing on one or more hardware processors may receive information about network flows (e.g., network flow attributes) for transmitting to one or more destination machines via a communication network. At 504, the network security service delivery controller may group the network flows into one or more similarity groups. The grouping the network flows in one embodiment is based on one or more attributes of the network flows, for example, one or more of an application type, network protocol and Internet Protocol address source of the network flows.

At 506, the network security service delivery controller may manage the network switches to transmit the network flows in a particular similarity group to a security appliance designated for the particular similarity group. In one aspect, the network security service delivery controller may direct mirroring or duplicating of the network flows to the security appliance designated for the particular similarity group In one embodiment, at 508, the network security service delivery controller may receive feedback from the security appliance, and based on the feedback, divide the one or more similarity groups into finer groups of similarity, and/or unify the similarity groups.

In one embodiment, at 510, the network security service delivery controller may receive feedback from the security appliance that the security appliance is in a resolution phase, and based on the feedback, may transmit a training result of the security appliance to one or more other security appliance instances and reroute at least some of the network flows in the particular similarity group to the one or more other security appliance instances. The processing at 508 and 510 may be performed optionally, and may be performed independently from one another. For instance, the processing at 508 may be performed without performing 510; the processing at 510 may be performed without performing 508. In another aspect, both 508 and 510 may be performed.

Figure 6:
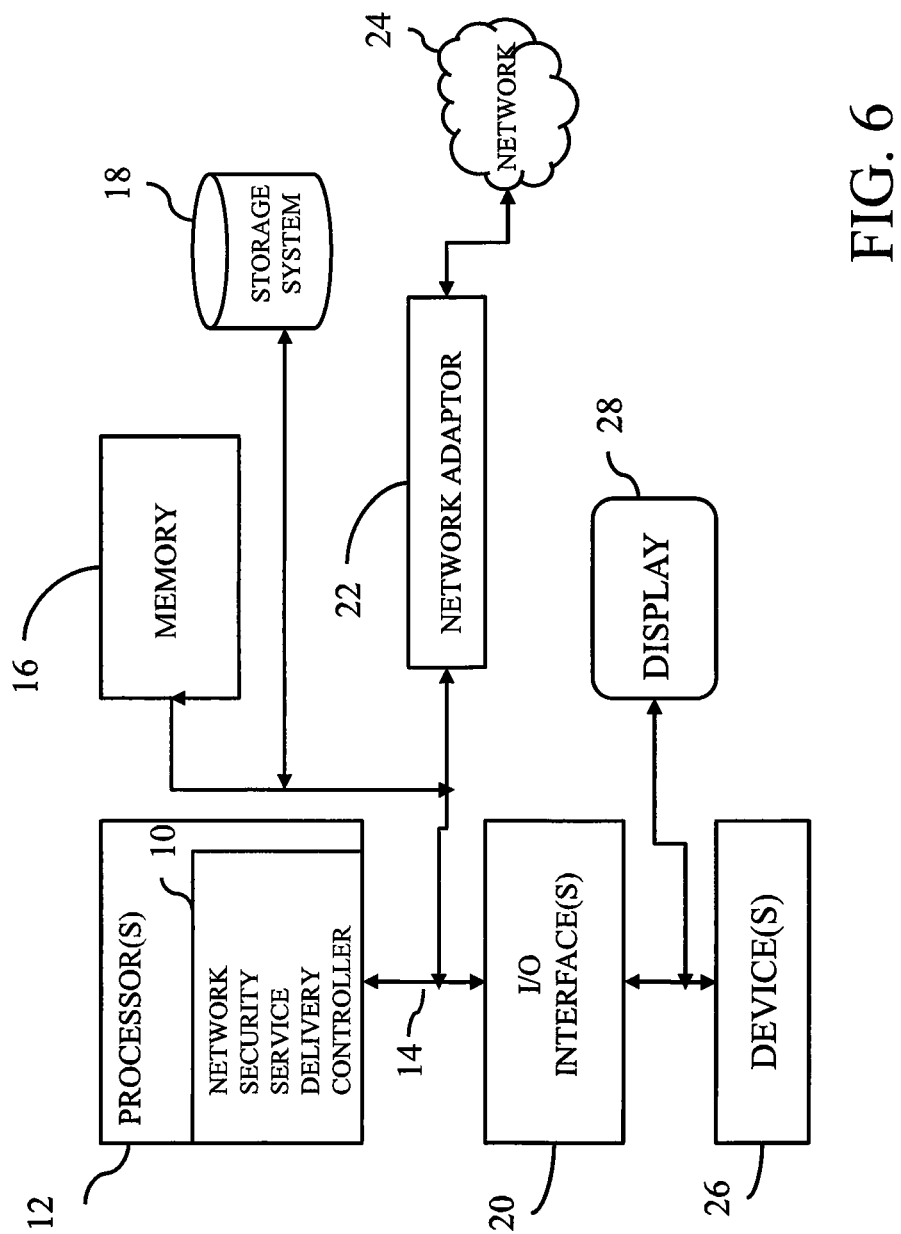
FIG. 6 illustrates a schematic of an example computer or processing system that may implement a computer network security system in one embodiment of the present disclosure.

FIG. 6 illustrates a schematic of an example computer or processing system that may implement a computer network security system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a controller module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A learning-based computer network security system, comprising:
   one or more hardware processors;
   a network security service delivery controller executing on one or more of the hardware processors,
   the network security service delivery controller operable to receive network flow attributes associated with a network flow, the network flow to be sent to one or more destination machines via a communication network,
   the network security service delivery controller further operable to group the network flow into a similarity group at least based on the network flow attributes, wherein the network security service delivery controller groups a plurality of network flows into a plurality of similarity groups,
   the network security service delivery controller further operable to designate a network security appliance instance from a plurality of network security appliance instances for a particular similarity group, wherein the network security service delivery controller designates each of the plurality of similarity groups respectively to a network security appliance instance in the plurality of network security appliance instances,
   the network security service delivery controller further operable to direct transmission of the network flow to the network security appliance designated for the similarity group associated with the network flow,
   wherein the plurality of network security appliance instances comprise hardware processors running network security appliance functionality,
   wherein each of the plurality of network security appliance instances learn to detect anomaly in the network flows associated with the respective similarity group at least based on the network flows it receives.

2. The system of claim 1, wherein the network security service delivery controller is further operable to designate two or more network security appliance instances from the plurality of network security appliance instances for a particular similarity group.

3. The system of claim 1, wherein the plurality of network security appliance instances operate in learning phase and resolution phase and the network security service delivery controller receives feedback from the plurality of network security appliance instances, the feedback comprising at least whether the network security appliance instances are operating in the learning phase or the resolution phase.

4. The system of claim 1, wherein based on feedback received from one or more of the plurality of network security appliance instances, the network security service delivery controller performs one or more of dividing the one or more similarity groups into finer groups of similarity and unifying the similarity groups.

5. The system of claim 1, wherein the attributes comprises one or more of an application type, network protocol and Internet Protocol address source of the network flows.

6. The system of claim 1, wherein the network security service delivery controller is further operable to receive feedback from the network security appliance instance that the network security appliance is in resolution phase, and based on the feedback the network security service delivery controller directs transmission of a training result of the network security appliance instance to one or more other network security appliance instances and reroutes at least some of the network flows in the particular similarity group to the one or more other network security appliance instances.

7. The system of claim 6, wherein the training result comprises one or more security rules associated with determining whether the network flows in the particular similarity group are anomalous.

8. A computer-implemented method of providing learning-based computer network security, comprising:
   receiving, by a network security service delivery controller executing on one or more hardware processors, network flow attributes associated with a network flow, the network flow to be sent to one or more destination machines via a communication network;
   grouping, by the network security service delivery controller the network flow into a similarity group at least based on the network flow attributes, wherein the network security service delivery controller groups a plurality of network flows into a plurality of similarity groups;
   determining, by the network security service delivery controller a network security appliance instance from a plurality of network security appliance instances for a particular similarity group, wherein the network security service delivery controller designates each of the plurality of similarity groups respectively to a network security appliance instance in the plurality of network security appliance instances; and
   directing transmission of the network flow to the network security appliance designated for the similarity group associated with the network flow,
   wherein the plurality of network security appliance instances comprise hardware processors running network security appliance functionality,
   wherein each of the plurality of network security appliance instances learn to detect anomaly in the network flows associated with the respective similarity group based on the network flows it receives.

9. The method of claim 8, wherein the network security service delivery controller designates two or more network security appliance instances from the plurality of network security appliance instances for the particular similarity group.

10. The method of claim 8, wherein the network security service delivery service controller receives and directs the network flow via a network connectivity controller operatively connected to the network security service delivery service controller.

11. The method of claim 8, wherein the plurality of network security appliance instances operate in learning phase and resolution phase and the network security service delivery controller receives feedback from the plurality of network security appliance instances, the feedback comprising at least whether the network security appliance instances are operating in the learning phase or the resolution phase.

12. The method of claim 8, wherein based on feedback received from one or more of the plurality of network security appliance instances, the network security service delivery controller performs one or more of dividing the one or more similarity groups into finer groups of similarity and unifying the similarity groups.

13. The method of claim 8, wherein the attributes comprises one or more of an application type, network protocol and Internet Protocol address source of the network flows.

14. The method of claim 8, further comprising:
receiving by the network security service delivery controller, feedback from the network security appliance instance that the network security appliance instance is in resolution phase; and
based on the feedback, directing by the network security service delivery controller, transmission of a training result of the network security appliance instance to one or more other network security appliance instances and rerouting at least some of the network flows in the particular similarity group to the one or more other network security appliance instances.

15. The method of claim 14, wherein the training result comprises one or more security rules associated with determining whether the network flows in the particular similarity group are anomalous.

16. A computer readable storage device storing a program of instructions executable by a machine to perform a method of providing learning-based computer network security, the method comprising:
receiving, by a network security service delivery controller executing on one or more hardware processors, network flow attributes associated with a network flow, the network flow to be sent to one or more destination machines via a communication network;
grouping, by the network security service delivery controller the network flow into a similarity group at least based on the network flow attributes, wherein the network security service delivery controller groups a plurality of network flows into a plurality of similarity groups;
determining, by the network security service delivery controller a network security appliance instance from a plurality of network security appliance instances for a particular similarity group, wherein the network security service delivery controller designates each of the plurality of similarity groups respectively to a network security appliance instance in the plurality of network security appliance instances; and
directing transmission of the network flow to the network security appliance designated for the similarity group associated with the network flow,
wherein the plurality of network security appliance instances comprise hardware processors running network security appliance functionality,
wherein each of the plurality of network security appliance instances learn to detect anomaly in the network flows associated with the respective similarity group based on the network flows it receives.

17. The computer readable storage device of claim 16, wherein the network security service delivery controller designates two or more network security appliance instances from the plurality of network security appliance instances for the particular similarity group.

18. The computer readable storage device of claim 16, wherein the plurality of network security appliance instances operate in learning phase and resolution phase and the network security service delivery controller receives feedback from the plurality of network security appliance instances, the feedback comprising at least whether the network security appliance instances are operating in the learning phase or the resolution phase.

19. The computer readable storage device of claim 16, wherein the attributes comprises one or more of an application type, network protocol and Internet Protocol address source of the network flows.

20. The computer readable storage device of claim 16, further comprising:
receiving by the network security service delivery controller, feedback from the network security appliance instance that the network security appliance instance is in resolution phase; and
based on the feedback, directing by the network security service delivery controller, transmission of a training result of the network security appliance instance to one or more other network security appliance instances and rerouting at least some of the network flows in the particular similarity group to the one or more other network security appliance instances.

* * * * *